United States Patent
Kim

(10) Patent No.: US 7,825,635 B2
(45) Date of Patent: Nov. 2, 2010

(54) COMPUTER SYSTEM AND CONTROL METHOD THEREOF CAPABLE OF CHANGING BATTERY CHARGING MODE ACCORDING TO USER'S SELECTION

(75) Inventor: Je-geol Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 704 days.

(21) Appl. No.: 11/759,022

(22) Filed: Jun. 6, 2007

(65) Prior Publication Data

US 2008/0084189 A1    Apr. 10, 2008

(30) Foreign Application Priority Data

Oct. 10, 2006    (KR) .................. 10-2006-0098629

(51) Int. Cl.
    *H02J 7/00*    (2006.01)
    *H01M 2/10*    (2006.01)
(52) U.S. Cl. ............... 320/160; 320/163; 320/106; 320/110; 320/125; 320/138; 429/99
(58) Field of Classification Search .......... 320/160, 320/163
    See application file for complete search history.

(56) References Cited

U.S. PATENT DOCUMENTS

| | | | | |
|---|---|---|---|---|
| 5,602,455 A | * | 2/1997 | Stephens et al. | 320/106 |
| 5,712,795 A | * | 1/1998 | Layman et al. | 700/297 |
| 5,717,309 A | * | 2/1998 | Cho | 320/125 |
| 6,181,103 B1 | * | 1/2001 | Chen | 320/106 |
| 6,424,123 B1 | * | 7/2002 | Odaohhara et al. | 320/134 |
| 6,998,821 B2 | * | 2/2006 | Sakai et al. | 320/138 |

FOREIGN PATENT DOCUMENTS

| | | |
|---|---|---|
| JP | 11-134072 | 5/1999 |
| JP | 2000-29576 | 1/2000 |
| JP | 2005-073434 | 3/2005 |
| KR | 2005-70192 | 7/2005 |

OTHER PUBLICATIONS

Office Action issued by The State Intellectual Property Office of People's Republic of China on Mar. 6, 2009.

* cited by examiner

*Primary Examiner*—Edward Tso
*Assistant Examiner*—Yalkew Fantu
(74) *Attorney, Agent, or Firm*—Jefferson IP Law, LLP

(57) ABSTRACT

A computer system, including a system unit having at least one device; a battery unit which supplies power to the system unit; a charging unit which charges the battery unit at a predetermined charging speed; a user input unit which receives a user input related to a charging speed of the battery unit; and a controller which controls the charging unit to charge the battery unit at the charging speed according to the user input.

14 Claims, 6 Drawing Sheets

COMPUTER SYSTEM AND CONTROL METHOD THEREOF CAPABLE OF CHANGING BATTERY CHARGING MODE ACCORDING TO USER'S SELECTION

CROSS-REFERENCE TO RELATED APPLICATION

This application claims the benefit of Korean Application No. 2006-98629, filed in the Korean Intellectual Property Office on Oct. 10, 2006, the disclosure of which is incorporated herein by reference.

BACKGROUND OF THE INVENTION

1. Field of the Invention

Aspects of the present invention relate to a computer system and a control method thereof and, more particularly, to a computer system and a control method thereof that includes an auxiliary power supply capable of being charged.

2. Description of the Related Art

A portable computer system (hereinafter "computer system") such as a laptop computer generally employs a main power supply, such as an alternating current (AC) adapter, and an auxiliary power supply capable of being charged, such as a battery. A conventional computer system periodically checks the battery. If the battery is equipped in the computer system that is coupled to the AC adopter and a predetermined battery charging condition is satisfied, the battery starts charging. The magnitude of a charging current is preset when the battery is charged.

If the battery charging condition is satisfied in a conventional computer system, the battery automatically starts charging. The user cannot control a charging mode of the battery as desired when the battery is charged. For example, even though the user may want the battery to be charged more promptly or does not want the battery to be charged, there is no method to control the battery in the conventional computer system.

SUMMARY OF THE INVENTION

Aspects of the present invention provide a computer system and control method thereof that can adjust a charging speed of a battery unit according to a user's selection.

Other aspects of the present invention provide a computer system and control method thereof that can select a battery charging mode by a simple manipulation.

Additional aspects and/or advantages of the invention will be set forth in part in the description which follows and, in part, will be obvious from the description, or may be learned by practice of the invention.

According to an aspect of the present invention, a computer system is provided, comprising a system unit comprising at least one device; a battery unit to supply power to the system unit; a charging unit to charge the battery unit at a predetermined charging speed; a user input unit to receive a user input related to a charging speed of the battery unit; and a controller to control the charging unit to charge the battery unit at the charging speed according to the user input.

According to another aspect of the invention, the controller controls the charging unit to charge the battery unit in one of a plurality of charging modes comprising a normal charging mode, a high speed charging mode where the battery unit is charged at a speed faster than the normal mode, and a stop charging mode where the battery is not charged, according to the user input.

According to another aspect of the invention, the user input unit comprises at least one button to select one of the charging modes, and the controller determines which charging mode is selected according to a manipulation of the button.

According to another aspect of the invention, the controller informs the system unit which charging mode is selected; and the system unit increases or decreases a power consumption of the devices according to the selected charging mode.

According to another aspect of the invention, the system unit comprises at least one of a central processing unit (CPU), a hard disk drive (HDD), an optical disk drive (ODD), and a liquid crystal display (LCD), and the system unit adjusts one of the speed of the CPU, driving speed of the HDD or the ODD, and brightness of the LCD to increase or decrease the power consumption of the device.

According to another aspect of the invention, the controller informs the system unit which charging mode is selected; the device comprises a display unit; and the system unit displays a selection state of the selected charging mode as a graphical user interface on the display unit.

According to another aspect of the invention, the controller generates a system management interrupt (SMI) signal or a system control interrupt (SCI) signal corresponding to the selected charging mode.

According to another aspect of the invention, the computer system further comprises a light emitting diode (LED), wherein the controller controls an operation of the LED according to the selected charging mode.

According to another aspect of the present invention, there is provided a control method of a computer system comprising a system unit that comprises at least one device and a battery unit that supplies power to the system unit, the control method comprising: checking whether a user input related to a charging speed of the battery unit is received; and charging the battery unit at the charging speed according to the user input if the user input is received.

According to another aspect of the invention, the charging the battery unit comprises selecting one of a plurality of charging modes comprising a normal charging mode, a high speed charging mode where the battery unit is charged at a speed faster than the normal mode, and a stop charging mode where the battery unit is not charged; and charging the battery unit in the selected mode.

According to another aspect of the invention, the selecting comprises determining which charging mode is selected, according to a manipulation of a user input unit.

According to another aspect of the invention, the control method further comprises informing the system unit of the selected charging mode; and increasing or decreasing a power consumption of the devices according to the selected charging mode.

According to another aspect of the invention, the increasing or decreasing of the power consumption comprises adjusting one of a speed of a CPU, a driving speed of a hard disk drive or an optical disk drive, and brightness of a display.

According to another aspect of the invention, the control method further comprises informing the system unit of the selected charging mode; and the system unit displays a selection state of selected charging mode as a graphical user interface.

According to another aspect of the invention, the informing the system unit which mode is selected comprises generating a system management interrupt (SMI) signal or a system control interrupt (SCI) signal corresponding to the selected charging mode.

According to an aspect of the invention, the control method further comprises controlling a light-emitting diode according to the selected charging mode.

BRIEF DESCRIPTION OF THE DRAWINGS

These and/or other aspects and advantages of the invention will become more apparent and more readily appreciated from the following description of the embodiments, take in conjunction with the accompanying drawings, in which.

DETAILED DESCRIPTION OF EMBODIMENTS

Figure 1:
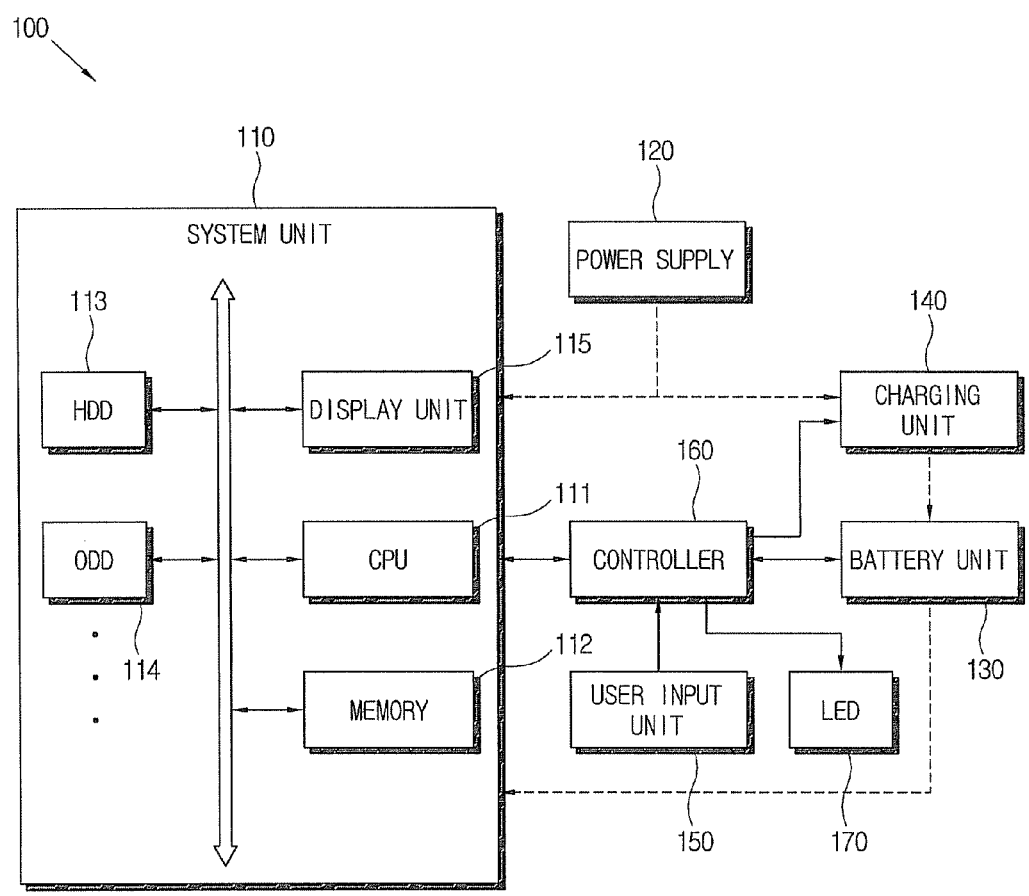
FIG. 1 is a block diagram illustrating a configuration of a computer system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates a configuration of a computer system 100 according to an embodiment of the present invention. The computer system 100 may be provided as a laptop computer, personal digital assistant, mobile phone, personal entertainment device, etc. The computer system 100 includes a system unit 110, a power supply 120, a battery unit 130, a charging unit 140, and a controller 160. The components of the computer system 100 may be incorporated in a single housing or may be separate.

The system unit 110, which performs operations of the computer system 100, includes at least one device, such as a central processing unit (CPU) 111 and a memory 112. The memory 112 may include a random access memory (RAM) (not shown), which temporarily stores a program executed by the CPU 111 and data processed by the CPU 111, and a read only memory (ROM) (not shown), which stores a basic input output system (BIOS) code. While not required in all aspects, the system unit 110 shown in FIG. 1 further includes a main storage unit, such as a hard disk drive (HDD) 113 that stores an operating system program and other application programs, such as Windows. While also not required in all aspects, the system unit 110 shown in FIG. 1 also includes an optical disk drive (ODD) 114 as an auxiliary storage unit and a display unit 115, such as a liquid crystal display (LCD) monitor, as a display device. The system unit 110 may further include a graphic processing unit (not shown) that performs processes to display graphics on the display unit 115. In addition, the system unit 110 may further include a north bridge and a south bridge that perform interface operations for data communications between the various devices. The system unit 110 may contain other devices in addition to, or instead of, the shown devices.

The power supply 120, which may be provided as a main power supply, supplies power to the system unit 110. The power supply 120 includes an AC adapter (not shown) that converts external AC power into direct current (DC) power having a predetermined level. However, it is understood that the power supply 120 can be another battery, a fuel cell or other device that supplies power. The battery unit 130, which may be provided as an auxiliary power supply, supplies power to the system unit 110. The battery unit 130 may be charged and may include a microcomputer (not shown) that transmits battery information related to the battery unit 130 to the controller 160. The battery information may include inside temperature, remaining power, and the like. The dotted lines in FIG. 1 indicate power supply routes. FIG. 1 shows power supply routes from the power supply 120 to the battery unit 130, the charging unit 140, and the system unit 110. Other power supply routes, such as a route to the controller 160, are omitted but may be included in other aspects of the invention.

The charging unit 140 includes a circuit that charges the battery unit 130 under the control of the controller 160. The charging unit 140, which is provided between the power supply 120 and the battery unit 130, charges the battery unit 130 using a charging current supplied from the power supply 120. The charging unit 140 includes two or more levels of charging current. As the level of the charging current increases, the speed of charging the battery unit 130 becomes faster. The charging unit 140 can charge the battery unit 130 using the charging current of up to a maximum permitted level supplied from the power supply 120. The level of the charging current is determined by the controller 160.

According to an embodiment of the present invention, three charging modes are provided. The level of the charging current is determined according to the respective charging modes. The charging modes may include a 'normal charging mode,' a 'high speed charging mode,' and a 'stop charging mode.' The 'normal charging mode' indicates a charging mode corresponding to a level of the charging current suitable for stably performing a general charging operation. The 'high speed charging mode' indicates a charging mode corresponding to a level of the charging current that is higher than the 'normal charging mode' and capable of charging the battery unit 130 at high speed. The 'stop charging mode' indicates a charging mode corresponding to a level of approximately 0 charging current and substantially stops the charging operation. In the 'stop charging mode', the charging operation is stopped, even though a charging operation may be needed. Other aspects of the invention may include other charging modes.

A user input unit 150 receives user input related to charging of the battery unit 130 and transmits the user input to the controller 160. The user input is related to selecting a speed of charging the battery unit 130. For example, the user input may select the 'normal charging mode,' the 'high speed charging mode,' or the 'stop charging mode.' The user input unit 150 may be provided as a keyboard (not shown), a mouse (not shown), or the like. The user input unit 150 may include at least one button (hereinafter referred to as a "charging mode selecting button") to select one of the 'normal charging mode,' the 'high speed charging mode,' or the 'stop charging mode'. The charging mode selecting button may also be provided as one key or a combination of keys on a keyboard, or may be an on-screen virtual button selectable using the mouse, a stylus, or by touch. Further, while described in terms of user input, it is understood that the input can be otherwise provided from non-users.

The controller 160 monitors whether the battery unit 130 should be charged. If the battery unit 130 should be charged, the controller 160 controls the charging unit 140 to charge the battery unit 130 at a predetermined speed. In particular, the controller 160 receives battery information from the battery unit 130 by communicating with the battery unit 130 at predetermined time intervals, and determines whether the battery unit 130 should be charged. The battery information may include a remaining power level. The controller 160 may be provided as a microcomputer.

The controller 160 controls the battery unit 130 to be charged when AC power is supplied from an AC adapter of the power supply and a predetermined charging condition is satisfied. For example, the charging condition may include a battery ID, whether a battery type is suitable for charging, and whether a battery temperature is lower than a predetermined temperature.

If the battery unit 130 should be charged and the charging condition is satisfied, the controller 160 controls the charging unit 140 to charge the battery unit 130 at a speed according to user input received through the user input unit 150. The controller 160 monitors the user input unit 150 at predetermined time intervals and controls the charging unit 140 to charge the battery unit 130 in the 'normal charging mode,' the 'high speed charging mode,' or the 'stop charging mode' according to the user input. The 'normal charging mode' may be preset as the default. The selected charging mode may be changed in a circular sequence of "the 'normal charging mode,' the 'high speed charging mode,' the 'stop charging mode,' the 'normal charging mode' . . . " whenever the charging mode selecting button is pushed. Other aspects of the invention may employ other ways for the user to select/change the charging mode.

The controller 160 transmits a control signal corresponding to the 'normal charging mode,' the 'high speed charging mode,' or the 'stop charging mode' to the charging unit 140. The controller 160 controls the respective control signals corresponding to the 'normal charging mode,' the 'high speed charging mode,' and the 'stop charging mode' to be outputted through a corresponding general purpose output (GPO) port (not shown). The charging unit 140 includes an input port (not shown) corresponding to the respective GPO ports. The charging unit 140 charges the battery unit 130 by adjusting a level of the charging current supplied to the battery unit 130 according to the control signal received from the controller 160 through the input port. The respective levels of the charging current to be supplied to the battery unit 130 corresponding to the control signal of the 'normal charging mode,' the 'high speed charging mode,' or the 'stop charging mode' may be preset in the charging unit 140. However, it is understood that additional modes can be used, such as settings to designate time to complete charging or time delays for when to start charging.

The computer system 100 further includes at least one light emitting diode (LED) 170. The controller 160 controls the LED 170 to be turned on or off according to the selected charging mode. For example, the controller 160 may control the LED 170 to be turned off when the charging mode is changed to the 'stop charging mode.' The controller 160 may control the LED 170 to be turned on and to emit orange light when the charging mode is changed to the 'normal charging mode.' The controller 160 may control the LED 170 to turn on and off repeatedly (flash) for a predetermined period of time when the charging mode is changed to the 'high speed charging mode.' The controller 160 may control the LED 170 to emit green light when charging of the battery is completed.

When the charging mode is changed to the 'high speed charging mode,' the controller 160 may maximize the charging current supplied to the battery unit 130 through the charging unit 140 by informing the system unit 110 that the charging mode is changed to the 'high speed charging mode' and decreasing a power consumption of the system unit 110. The controller 160 may inform the system unit 110 that the charging mode is changed to the 'high speed charging mode' by generating an interrupt signal, such as a system management interrupt (SMI) signal and/or a system control interrupt (SCI) signal. The interrupt signal may include information on the changing charging modes.

The controller 160 may be coupled to a south bridge (not shown). The interrupt signal generated from the controller 160 may be transmitted to the CPU 111 through the south bridge. An operating system program and/or an application program (when the operating system program is executed) or a basic input output system (BIOS) program (when the operating system program is not executed) determine whether the 'high speed charging mode' is selected and may control operation of the device(s) to decrease power consumption of the device to a predetermined value in accordance with the interrupt signal. For example, to decrease or increase power consumption of the device, the system unit 110 may adjust the throttling of the CPU 111, the driving speed of the HDD 113 or the ODD 114, and/or the brightness of the display unit 115. The system unit 110 may take other measures to adjust power consumption as well.

If the charging mode is changed from the 'high speed charging mode' to the 'normal charging mode,' the controller 160 informs the system unit 110 that the charging mode is changed from the 'high speed charging mode' to the 'normal charging mode.' The system unit 110 then brings the power consumption of the device back to the normal state.

Figure 4A:
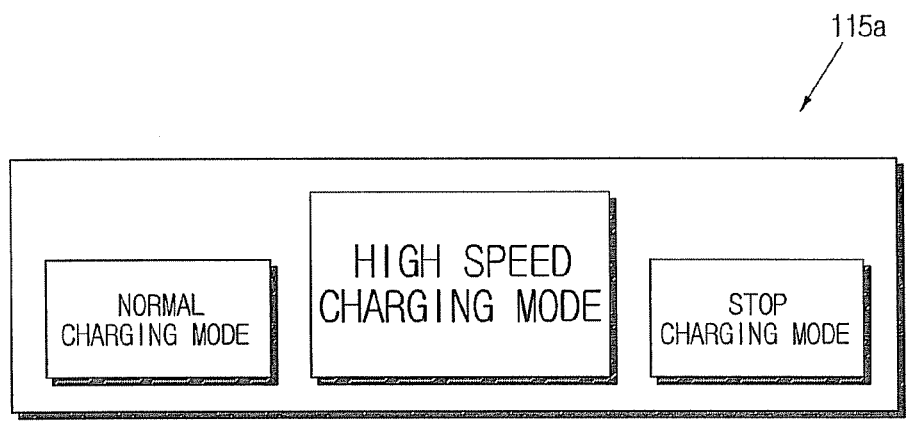
FIGS. 4A and 4B illustrate selections of a charging mode displayed on a display unit in a computer system according to an embodiment of the present invention.
Figure 4B:
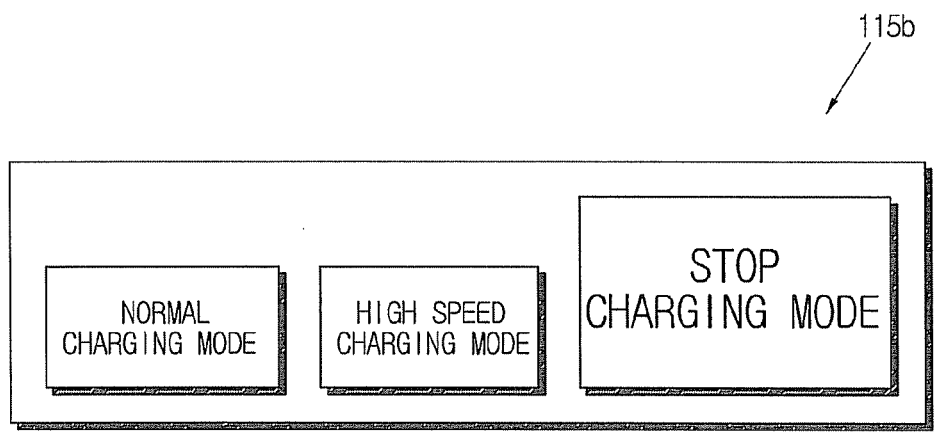

The system unit 110 may display a selecting state on the display unit 115 in a graphical user interface (GUI) 115a, shown in FIGS. 4A and 4B. For example, FIGS. 4A and 4B illustrate that the selected charging mode may be circularly changed whenever the charging mode selecting button of the user input unit 150 is pushed. The controller 160 transmits input state information (a "scan code") related to the charging mode selecting button to the system unit 110. The system unit 110 may display the selected charging mode corresponding to the user input on the display unit 115. Other aspects of the invention may employ different interfaces to allow the user to select or change the charging mode.

Figure 2A:
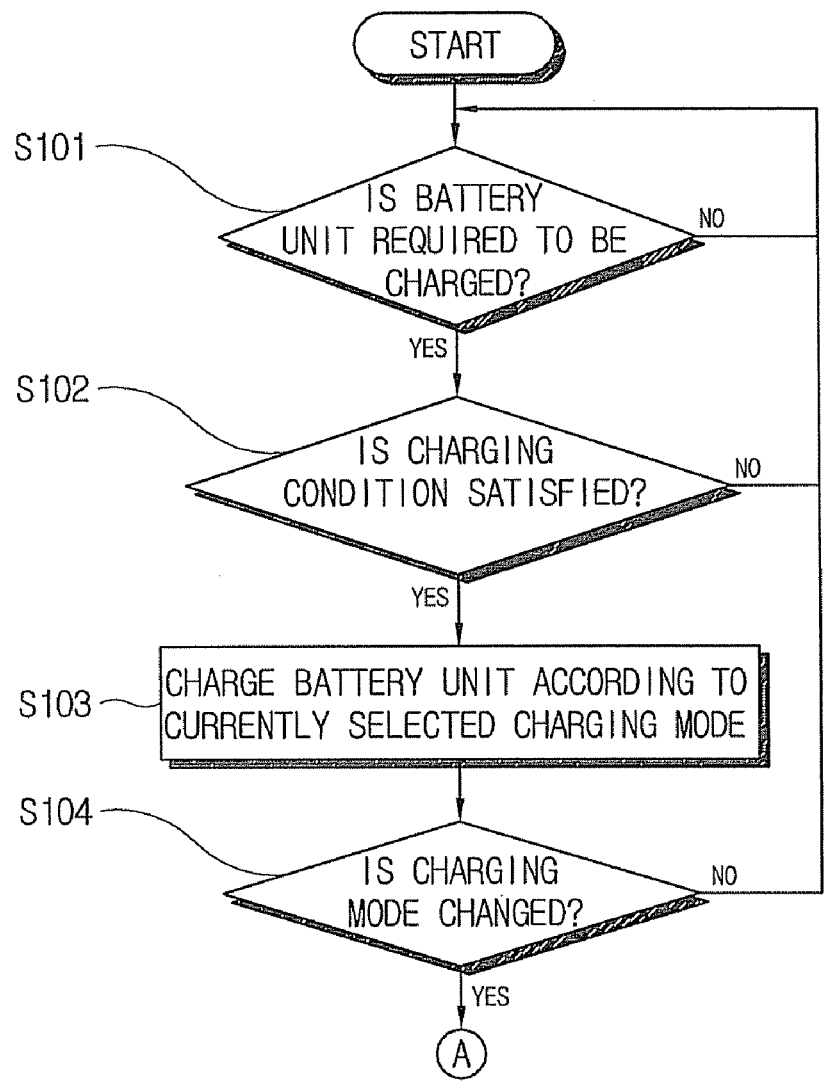
FIGS. 2A and 2B are flow charts illustrating an operation of a controller in a computer system according to an embodiment of the present invention.
Figure 2B:
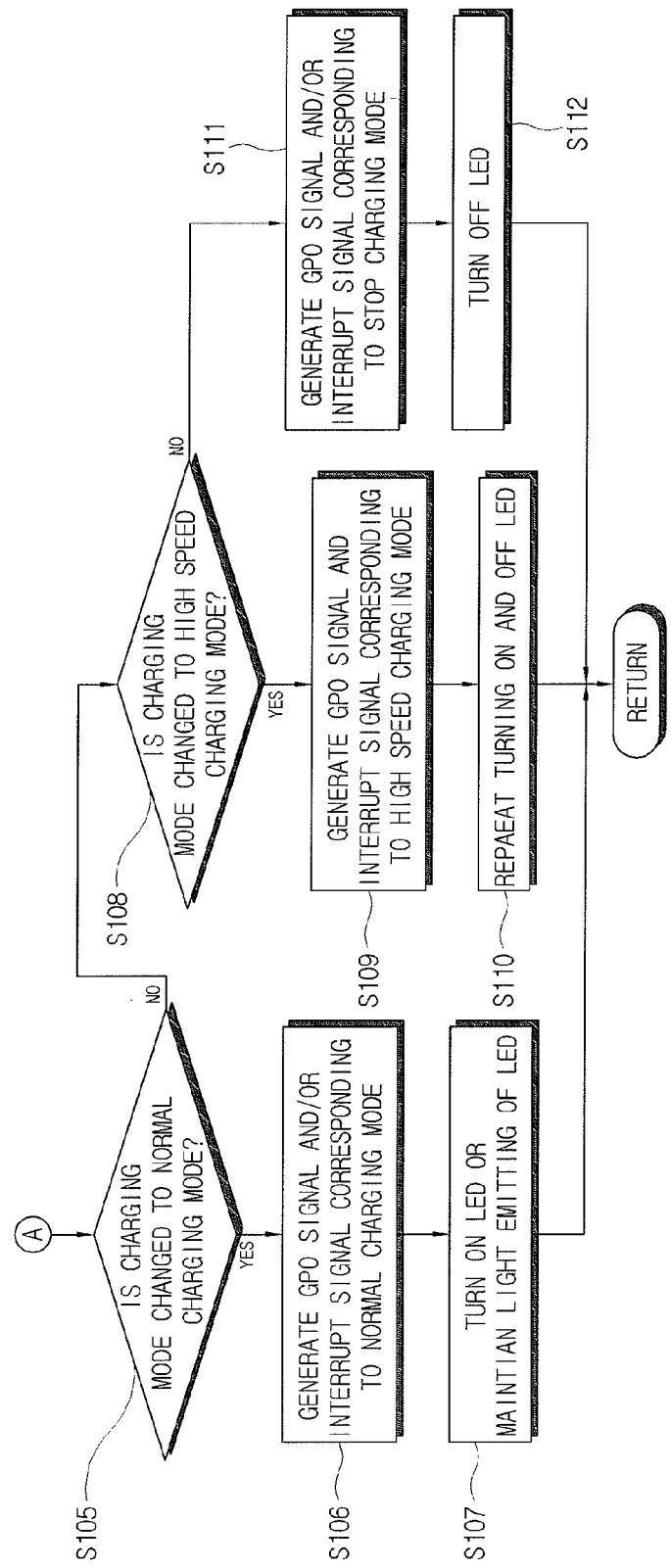

FIGS. 2A and 2B are flow charts illustrating an operation of the controller 160 in the computer system 100 according to an exemplary embodiment of the present invention. First, the controller 160 monitors whether the battery unit 130 should be charged (S101). If a result of the monitoring in operation S101, for example, shows that the battery unit 130 is not completely charged and should be charged, the controller 160 determines whether the charging condition of the battery unit 130 is satisfied (S102). If the charging condition of the battery unit 130 is not satisfied in operation S102, the operation returns to operation S101. If the charging condition of the battery unit 130 is satisfied in operation S102, the controller 160 controls the charging unit 140 to charge the battery unit 130 according to a currently selected charging mode (S103).

Then, the controller 160 determines whether a user input to change the charging mode is received (S104). If the user input to change the charging mode is not received in operation S104, the operation returns to operation S101. If the user input to change the charging mode is received in operation S104, the controller 160 checks whether the charging mode is changed to the 'normal charging mode' (S105). If the charging mode is changed to the 'normal charging mode' in operation S105, the controller 160 generates a control signal and/or an interrupt signal corresponding to the 'normal charging mode' (S106). For example, if the charging mode is changed from the 'high speed charging mode' to the 'normal charging mode,' a control signal and an interrupt signal corresponding to the 'normal charging mode' are transmitted to the charging unit 140 and the system unit 110, respectively. Accordingly, the charging unit 140 decreases the charging current to the normal state, and the system unit 110 brings an operation of a device back to the normal state. If the charging mode is changed from the 'stop charging mode' to the 'normal charging mode,' the control signal corresponding to the 'normal charging mode' is transmitted to the charging unit 140. Accordingly, the charging unit 140 increases the charging current to a normal level corresponding to the normal state. Further, the controller 160 turns on the LED 170 or, if the LED 170 is already on, maintains the LED 170 in the on state (S107).

If the charging mode is not changed to the 'normal charging mode' in operation S105, the controller 160 checks whether the charging mode is changed to the 'high speed charging mode' (S108). If the charging mode is changed to the 'high speed charging mode' in operation S108, the controller 160 generates a control signal and an interrupt signal corresponding to the 'high speed charging mode' (S109). The generated control signal and interrupt signal are transmitted to the charging unit 140 and the system unit 110, respectively. Accordingly, the charging unit 140 increases the level of the charging current to a level capable of charging the battery 130 at high speed. The system unit 110 controls the operation of the device so that the power consumption of the device can be reduced to below a predetermined value. Further, the controller 160 flashes the LED 170 to indicate the changing of the charging mode.

If the charging mode is not changed to the 'high speed charging mode' in operation S108, the controller 160 generates a control signal and/or an interrupt signal corresponding to the 'stop charging mode' (S111). If the charging mode is changed from the 'high speed charging mode' to the 'stop charging mode,' the generated control signal and interrupt signal are transmitted to the charging unit 140 and the system unit 110, respectively. Accordingly, the charging unit 140 decreases the charging current to approximately 0, to thereby stop charging the battery 130. The system unit 110 brings the operation of the device back to the normal state. If the charging mode is changed from the 'normal charging mode' to the 'stop charging mode,' the control signal corresponding to the 'stop charging mode' is transmitted to the charging unit 140. Further, the controller 160 indicates the changing of the mode to the 'stop charging mode' by turning off the LED 170 (S112).

When operations S107, S10 or S112 are completed, the operation returns to operation S101. If the user input to change the charging mode is received in operation S104, the controller 160 may inform the system unit 110 that the user input to change the charging mode is received and may display the state of selecting the charging mode on the display unit 115.

Figure 3:
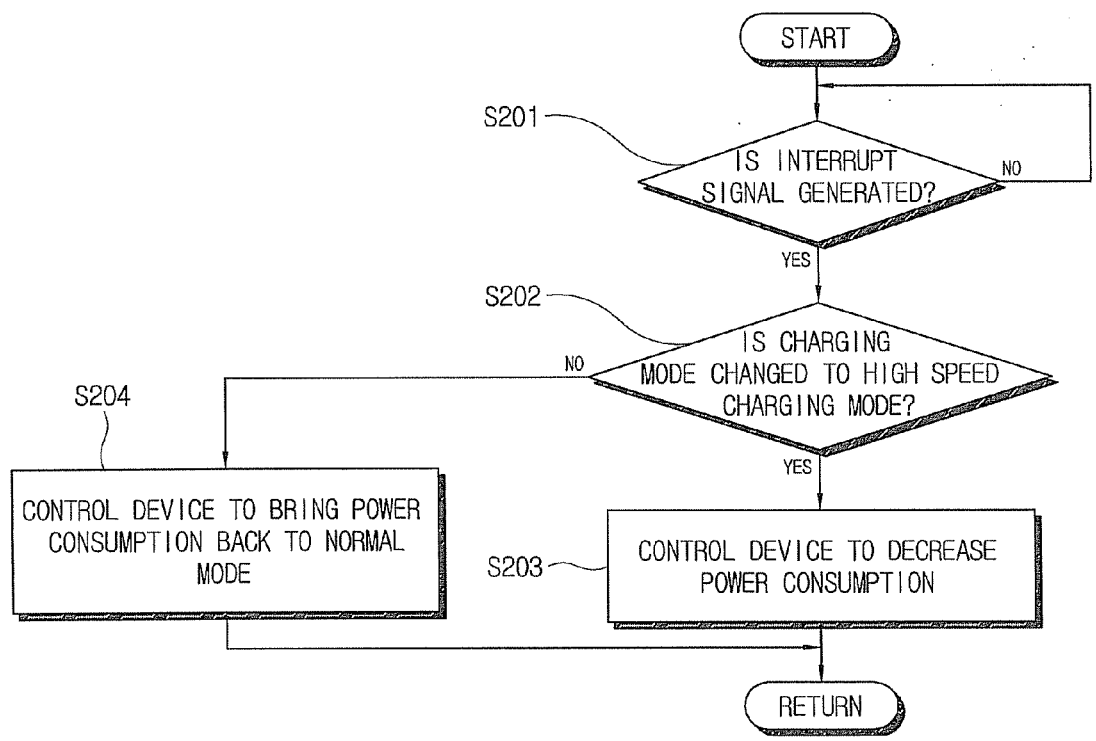
FIG. 3 is a flow chart illustrating an operation of a system unit in a computer system according to an embodiment of the present invention.

FIG. 3 is a flow chart illustrating an operation of the system unit 110 in the computer system 100 according to an embodiment of the present invention. The system unit 110 checks whether the controller 160 has generated the interrupt signal related to selection of the charging mode while operating the system unit 110 (S201). If the controller 160 generates the interrupt signal in operation S201, the system unit 110 determines whether the charging mode is changed from the 'normal charging mode' to the 'high speed charging mode' (S202). If the charging mode is changed from the 'normal charging mode' to the 'high speed charging mode' in operation S202, the system unit 110 controls the device (such as the CPU 111) to decrease the power consumption of the device (S203). If the charging mode is changed from the 'high speed charging mode' to the 'normal charging mode' in operation S202, the system unit 110 controls the device to bring the power consumption back to the normal state (S204).

As is apparent from the above description, according to aspects of the present invention, a computer system and control method thereof are provided, which can adjust a charging speed of a battery unit according to a user's selection. Accordingly, aspects of the present invention can decrease a standby time that a user waits until fully charging a battery unit by charging the battery unit more promptly according to a user's selection, thereby improving the convenience of the user.

Aspects of the present invention also provides a computer system and control method thereof, which can select a battery charging mode by a simple manipulation of a button.

Battery management techniques according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD disks and DVD; magneto-optical media such as optical disks; and hardware devices that are specially configured to store and perform program instructions, such as read-only memory (ROM), random access memory (RAM), flash memory, and the like; and a computer data signal embodied in a carrier wave comprising a compression source code segment and an encryption source code segment (such as data transmission through the Internet). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, it will be appreciated by those skilled in the art that changes may be made in this embodiment without departing from the principles and spirit of the invention, the scope of which is defined in the appended claims and their equivalents.

What is claimed is:

1. A computer system, comprising: a system unit comprising at least one computer device; a battery unit to supply power to the system unit; a charging unit to charge the battery unit at a predetermined charging speed; a user input unit to receive a user input related to a charging speed of the battery unit; and a controller to control the charging unit to charge the battery unit at the predetermined charging speed according to the received user input received by the user input unit, and wherein the controller controls the charging unit to charge the battery unit in one of a plurality of charging modes comprising a normal charging mode, a high speed charging mode wherein the battery unit is charged at a speed faster than the normal mode, and a stop charging mode where the battery is not charged, according to the received user input.

2. The computer system according to claim 1, wherein:
   the user input unit comprises at least one button to select one of the charging modes, and
   the controller determines which charging mode is selected according to a manipulation of the button.

3. The computer system according to claim 1, wherein:
   the controller informs the system unit which charging mode is selected; and
   the system unit increases or decreases a power consumption of the computer devices according to the selected charging mode.

4. The computer system according to claim 3, wherein:
the at least one computer device of the system unit comprises at least one of a central processing unit (CPU), a hard disk drive (HDD), an optical disk drive (ODD), and a liquid crystal display (LCD); and
the system unit adjusts one of the speed of the CPU, the driving speed of the HDD or the ODD, and the brightness of the LCD to increase or decrease the power consumption of the devices.

5. The computer system according to claim 3, wherein the controller generates a system management interrupt (SMI) signal or a system control interrupt (SCI) signal corresponding to the selected charging mode.

6. The computer system according to claim 1, wherein:
the controller informs the system unit which charging mode is selected;
the at least one device includes a display unit; and
the system unit displays a selection state of the selected charging mode as a graphical user interface on the display unit.

7. The computer system according to claim 1, further comprising:
a light emitting diode (LED), wherein the controller controls an operation of the LED according to the selected charging mode.

8. A control method of a computer system comprising a system unit that comprises at least one device and a battery unit that supplies power to the system unit, the control method comprising: checking whether a user input related to a charging speed of the battery unit is received at a controller; charging the battery unit at the charging speed according to the user input when the user input is received by selecting one of a plurality of charging modes comprising a normal charging mode, a high speed charging mode where the battery unit is charged at a speed faster than the normal mode, and a stop charging mode where the battery unit is not charged, and charging the battery unit in the selected mode, wherein the selecting comprises determining which charging mode is selected, according to a manipulation of a user input unit; and controlling a power consumption of at least one of the devices according to the selected charging mode.

9. A control method of a computer system comprising a system unit that comprises at least one device and a battery unit that supplies power to the system unit, the control method comprising:
checking whether a user input related to a charging speed of the battery unit is received at a controller;
charging the battery unit at the charging speed according to the user input when the user input is received by selecting one of a plurality of charging modes comprising a normal charging mode, a high speed charging mode where the battery unit is charged at a speed faster than the normal mode, and a stop charging mode where the battery unit is not charged, and charging the battery unit in the selected mode;
informing the system unit of the selected charging mode; and
increasing or decreasing a power consumption of the devices according to the selected charging mode,
wherein the informing the system unit of the selected charging mode comprises generating a system management interrupt (SMI) signal or a system control interrupt (SCI) signal corresponding to the selected charging mode.

10. A control method of a computer system comprising a system unit that comprises at least one device and a battery unit that supplies power to the system unit, the control method comprising: checking whether a user input related to a charging speed of the battery unit is received at a controller; charging the battery unit at the charging speed according to the user input when the user input is received by selecting one of a plurality of charging modes comprising a normal charging mode, a high speed charging mode where the battery unit is charged at a speed faster than the normal mode, and a stop charging mode where the battery unit is not charged, and charging the battery unit in the selected mode; controlling a power consumption of at least one of the devices according to the selected charging mode; and controlling a light-emitting diode (LED) according to the selected charring mode.

11. A power control system comprising: a battery to supply power to a computer system; a charging unit to charge the battery at a charging speed; and a controller to control the charging unit to charge at the charging speed based on received input, wherein the computer system changes a power consumption of at least one component of the computer system according to the received input, and wherein the controller controls the charging unit to charge the battery unit in one of a plurality of charging modes comprising a first charging mode, a second charging mode where the battery unit is charged at a speed faster than the first mode, and a third charging mode where the battery is charged at a speed slower than the first mode or is not charged, based on the received input.

12. The power control system according to claim 11, wherein:
the controller informs a system unit of the selected charging mode; and
the system unit computer system changes the power consumption of the at least one component of the system unit according to the selected charging mode.

13. The power control system according to claim 12, wherein the computer system changes the power consumption by adjusting at least one of a speed of a central processing unit (CPU), a driving speed of a hard disk drive or optical disk drive, and a brightness of a display.

14. The power control system according to claim 12, wherein:
the controller informs the computer system of the selected charging mode; and
the computer system displays, on a display, a graphical user interface to allow the user to determine the current charging mode and to select another charging mode.

* * * * *